US012451094B2

(12) United States Patent
Liu

(10) Patent No.: US 12,451,094 B2
(45) Date of Patent: Oct. 21, 2025

(54) DISPLAY DRIVING CIRCUIT, DISPLAY DRIVING DEVICE, AND DISPLAY DRIVING METHOD

(71) Applicant: Shenzhen China Star Optoelectronics Semiconductor Display Technology Co., Ltd., Shenzhen (CN)

(72) Inventor: Fangyun Liu, Shenzhen (CN)

(73) Assignee: Shenzhen China Star Optoelectronics Semiconductor Display Technology Co., Ltd, Shenzhen (CN)

( * ) Notice: Subject to any disclaimer, the term of this patent is extended or adjusted under 35 U.S.C. 154(b) by 73 days.

(21) Appl. No.: 17/769,734

(22) PCT Filed: Mar. 25, 2022

(86) PCT No.: PCT/CN2022/083069

§ 371 (c)(1),
(2) Date: Apr. 16, 2022

(87) PCT Pub. No.: WO2023/168762

PCT Pub. Date: Sep. 14, 2023

(65) Prior Publication Data

US 2024/0420659 A1 Dec. 19, 2024

(30) Foreign Application Priority Data

Mar. 11, 2022 (CN) ......................... 202210238445.8

(51) Int. Cl.
*G09G 3/20* (2006.01)
*G09G 3/36* (2006.01)
*G09G 3/00* (2006.01)

(52) U.S. Cl.
CPC ......... *G09G 3/3677* (2013.01); *G09G 3/2096* (2013.01); *G09G 3/006* (2013.01);
(Continued)

(58) Field of Classification Search
CPC .... G09G 3/3677; G09G 3/2096; G09G 3/006; G09G 2310/0289; G09G 2320/02;
(Continued)

(56) References Cited

U.S. PATENT DOCUMENTS

2016/0018916 A1* 1/2016 Lee .................... G06F 3/04184 345/173
2017/0162106 A1 6/2017 Tsai et al.
(Continued)

FOREIGN PATENT DOCUMENTS

CN 101667400 A 3/2010
CN 103929161 A 7/2014
(Continued)

OTHER PUBLICATIONS

International Search Report in International application No. PCT/CN2022/083069,mailed on Nov. 29, 2022.
(Continued)

*Primary Examiner* — Abdul-Samad A Adediran
(74) *Attorney, Agent, or Firm* — Nathan & Associates; Menachem Nathan

(57) ABSTRACT

Embodiments of the present disclosure are directed to a display driving circuit, a display driving device, and a display driving method. The display driving circuit comprises a power management chip, a level shifter, and a detection circuit. The power management chip is electrically connected with the level shifter and the detection circuit. The power management chip is configured to send first configuration information, generate second configuration information according to a detection voltage, and send the second configuration information. The level shifter is configured to output multiple clock signals according to the first configuration information or the second configuration information. The detection circuit is configured to generate the detection voltage according to an output voltage of the power management chip and a preset threshold and send the detection voltage to the power management chip.

19 Claims, 5 Drawing Sheets

(52) U.S. Cl.
CPC . *G09G 2310/0289* (2013.01); *G09G 2320/02* (2013.01); *G09G 2330/021* (2013.01); *G09G 2370/00* (2013.01)

(58) Field of Classification Search
CPC ......... G09G 2330/021; G09G 2370/00; G09G 3/20; G09G 3/3225; G06F 3/044; G06F 3/04184
USPC ........................................................... 345/173
See application file for complete search history.

(56) References Cited

U.S. PATENT DOCUMENTS

| | | | | |
|---|---|---|---|---|
| 2019/0102022 | A1* | 4/2019 | Jang | G06F 3/044 |
| 2019/0384475 | A1* | 12/2019 | Kim | G09G 3/3225 |
| 2020/0320953 | A1* | 10/2020 | Choi | G09G 3/20 |

FOREIGN PATENT DOCUMENTS

| | | | |
|---|---|---|---|
| CN | 105223713 | A | 1/2016 |
| CN | 105513526 | A | 4/2016 |
| CN | 105679230 | A | 6/2016 |
| CN | 106228944 | A | 12/2016 |
| CN | 108877726 | A | 11/2018 |
| CN | 109658887 | A | 4/2019 |
| CN | 209947397 | U | 1/2020 |
| CN | 110970052 | A | 4/2020 |
| CN | 110970419 | A | 4/2020 |
| CN | 111192542 | A | 5/2020 |
| JP | 2004247482 | A | 9/2004 |
| JP | 2014236414 | A | 12/2014 |
| KR | 20160035191 | A | 3/2016 |

OTHER PUBLICATIONS

Written Opinion of the International Search Authority in International application No. PCT/CN2022/083069, mailed on Nov. 29, 2022.

Chinese Office Action issued in corresponding Chinese Patent Application No. 202210238445.8 dated Sep. 20, 2022, pp. 1-6.

* cited by examiner

DISPLAY DRIVING CIRCUIT, DISPLAY DRIVING DEVICE, AND DISPLAY DRIVING METHOD

CROSS REFERENCE TO RELATED APPLICATION

This application is a US national phase application based upon an International Application No. PCT/CN2022/083069, filed on Mar. 25, 2022, which claims the priority of Chinese Patent Application No. 202210238445.8, entitled "DISPLAY DRIVING CIRCUIT, DISPLAY DRIVING DEVICE, AND DISPLAY DRIVING METHOD", filed on Mar. 11, 2022, the disclosure of which is incorporated herein by reference in its entirety.

FIELD OF THE DISCLOSURE

The present disclosure relates to a field of display technology, and in particular, to a display driving circuit, a display driving device, and a display driving method.

BACKGROUND

A liquid crystal display (LCD) panel includes a level shifter and a GOA (gate driver on array) circuit. The level shifter can be used to output CK signals to supply power to the GOA circuit of the liquid crystal display panel, and the GOA circuit is used to drive the display panel for display.

The CK signals output by the level shifter in the related art are involved in various output modes, such as 6 CK and 8 CK modes. The 6 CK mode represents 6 clock signals, and the 8 CK mode represents 8 CK signals. After a display panel side determines the required CK signals, the output mode of the level shifter is fixed. However, under the influence of external conditions such as electro-static discharge (ESD), the register data in the level shifter may be set, which in turn causes the output mode of the level shifter to change. For example, originally 8 CK signals should be output, but only 6 CK signals are output as lacking of two CK signals, which causes the timing of the GOA signal of the display panel to be chaotic, such that the display panel displays abnormal images.

The present disclosure is mainly aimed at how to improve abnormality of displayed images caused by an output error of a level shifter.

SUMMARY

Technical Problem

Thus, the present disclosure provides a display driving circuit, a display driving device, and a display driving method, which can avoid an output error of a level shifter, thereby improving abnormality of display images caused by the output error of the level shifter.

Technical Solution

According to one aspect of the present disclosure, a display driving circuit is provided. The display driving circuit comprises a power management chip, a level shifter, and a detection circuit. The power management chip is electrically connected with the level shifter and the detection circuit. The power management chip is configured to send first configuration information, generate second configuration information according to a detection voltage, and send the second configuration information. The level shifter is configured to output multiple clock signals according to the first configuration information or the second configuration information. The detection circuit is configured to generate the detection voltage according to an output voltage of the power management chip and a preset threshold and send the detection voltage to the power management chip.

Furthermore, the detection circuit comprises a voltage division circuit and a comparison circuit, and the voltage division circuit is electrically connected to the comparison circuit.

Furthermore, the output voltage of the power management chip comprises a first output voltage and a second output voltage. The voltage division circuit is configured to divide the first output voltage to obtain a divided voltage, and the divided voltage is equal to the second output voltage. The comparison circuit is configured to compare the divided voltage with the preset threshold to generate the detection voltage.

Furthermore, the voltage division circuit comprises a first resistor electrically connected between the first output voltage and the comparison circuit, and a second resistor electrically connected to the first resistor.

Furthermore, the comparison circuit comprises a comparator, and the comparator comprises a positive input terminal electrically connected to the divided voltage and the second output voltage, a negative input terminal electrically connected to a reference voltage, and an output terminal is electrically connected to the detection voltage.

Furthermore, when a voltage input from the positive input terminal of the comparator does not exceed the reference voltage, the detection voltage output by the comparator is at a low level; when the voltage input from the positive input terminal of the comparator exceeds the reference voltage, the detection voltage output by the comparator is a at a high level.

Furthermore, the comparator is used to compare an input of the comparator with a preset threshold range.

Furthermore, the detection circuit further comprises a voltage stabilization circuit, and the voltage stabilization circuit is electrically connected to the voltage division circuit and the comparison circuit.

Furthermore, the voltage stabilization circuit comprises a first voltage-stabilization diode and a second voltage-stabilization diode. The first voltage-stabilization diode includes an anode electrically connected to the second output voltage, and a cathode is electrically connected to the positive input terminal of the comparator. The second voltage-stabilization diode includes an anode electrically connected to the voltage division and a cathode is electrically connected to the positive input terminal of the comparator.

Furthermore, the power management chip is configured to receive a detection signal output by the comparison circuit and regenerate the second configuration information when a rising edge of the detection signal is detected.

Furthermore, the level shifter is electrically connected to an external pixel unit array for controlling pixel units in respective rows in the pixel unit array to be scanned row by row.

Furthermore, the second configuration information comprises adjusted register data in the power management chip, and the register data is configured to drive the level shifter to generate a plurality of scan signals.

Furthermore, the display driving circuit further comprises a timing controller which is electrically connected to the power management chip.

Furthermore, the power management chip comprises a register map, and the register map is configured to store the first configuration information and the second configuration information.

According to another aspect of the present disclosure, a display driving device is provided. The display driving device comprising a terminal host and the display driving circuit. The terminal host is electrically connected to the display driving circuit.

According to another aspect of the present disclosure, a display driving method is provided. The display driving method is applied to the display driving circuit. The display driving method comprises: by a power management chip, sending first configuration information to level shifter; by a detection circuit, detecting an output voltage of a power management chip; by a detection circuit, generating a detection voltage according to an output voltage of the power management chip and a preset threshold and sending the detection voltage to a power management chip; by a power management chip, regenerating the second configuration information according to a detection voltage sent by a detection circuit and sending the second configuration information to a level shifter; by a level shifter, outputting clock signals in multiple according to the first configuration information or the second configuration information.

Furthermore, an output voltage of the power management chip comprises a first output voltage and a second output voltage, and generating a detection voltage according to the output voltage of the power management chip and a preset threshold comprises: dividing the first output voltage to obtain a divided voltage, the divided voltage being equal to the second output voltage; and comparing the divided voltage with a preset threshold to generate the detection voltage.

Furthermore, the comparing the divided voltage with a preset threshold to generate the detection voltage comprises: configuring the detection voltage output by to be at a low level the comparator when a voltage input from a positive input terminal of the comparator does not exceed the reference voltage; configuring a detection voltage output is a at a high level by the comparator when a voltage input at a positive input terminal of the comparator exceeds the reference voltage.

Furthermore, by the power management chip, regenerating second configuration information according to the detection voltage sent by the detection circuit comprises: receiving a detection signal output by a comparison circuit; and regenerating the second configuration information when a rising edge of the detection signal is detected.

Furthermore, the display driving method further comprises: storing the second configuration information; and driving the level shifter according to the second configuration information to generate a plurality of scan signals.

Advantageous Effect

The detection circuit is included in the display driving circuit. The detection circuit is used to detect the output voltage of the power management chip, the detection voltage is generated according to the output voltage of the power management chip and the preset threshold, and the detection voltage is sent to the power management chip. The power management chip regenerates the second configuration information according to the detection voltage sent by the detection circuit and sends the second configuration information to the level shifter. The level shifter outputs multiple clock signals according to the second configuration information, which can avoid the output error of the level shifter, thereby improving the abnormality of the display images caused by the output error of the level shifter.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

Figure 1:
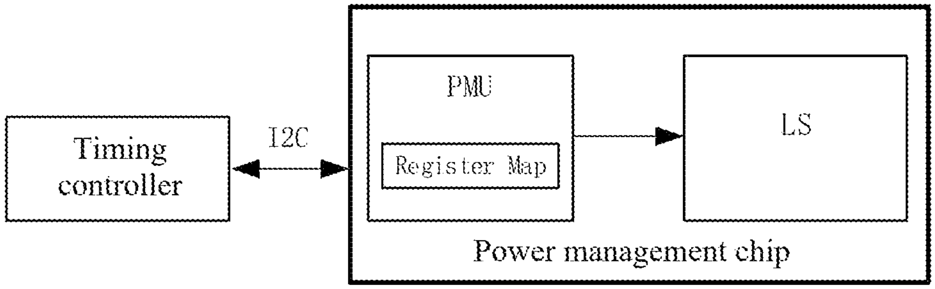
FIG. 1 shows a block diagram of a power management system in a related art.

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

It is understood that terminologies, such as “center,” “longitudinal,” “horizontal,” “length,” “width,” “thickness,” “upper,” “lower,” “before,” “after,” “left,” “right,” “vertical,” “horizontal,” “top,” “bottom,” “inner,” “outer,” “clockwise,” and “counterclockwise,” are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification. In addition, the term “first”, “second” are for illustrative purposes only and are not to be construed as indicating or imposing a relative importance or implicitly indicating the number of technical features indicated. Thus, a feature that limited by “first”, “second” may expressly or implicitly include at least one of the features. In the description of the present disclosure, the meaning of “plural” is two or more, unless otherwise specifically defined.

All of the terminologies containing one or more technical or scientific terminologies have the same meanings that persons skilled in the art understand ordinarily unless they are not defined otherwise. For example, “arrange,” “couple,” and “connect,” should be understood generally in the embodiments of the present disclosure. For example, “firmly connect,” “detachably connect,” and “integrally connect” are all possible. It is also possible that “mechanically connect,” “electrically connect,” and “mutually communicate” are used. It is also possible that “directly couple,” “indirectly couple via a medium,” and “two components mutually interact” are used.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement. The methods proposed by the present disclosure provide a variety of examples with a variety of processes and materials. However, persons skilled in the art understand ordinarily that the application of other processes and/or the use of other kinds of materials are possible.

FIG. 1 shows a block diagram of a power management system in a related art.

The power management system in the related art may comprise a timing controller (TCON) and a power management IC (PMIC). The power management IC may comprise a power management chip (PMU) and a level shifter (LS). A register map is disposed in the power management chip. The power management chip is electrically connected with the level shifter.

Figure 2:
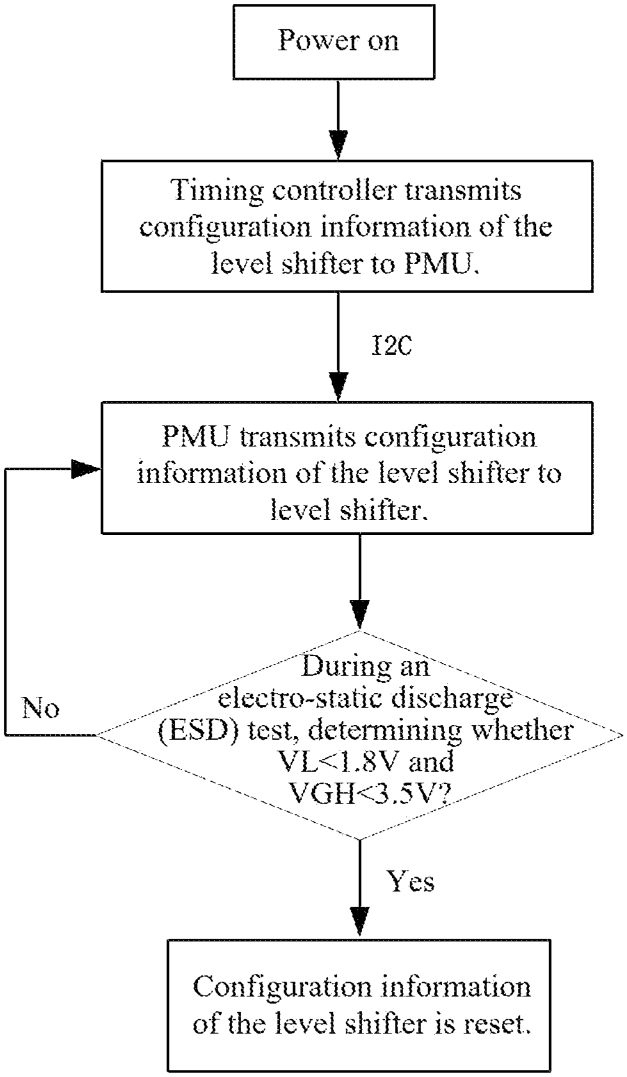
FIG. 2 is a schematic diagram showing an operation of a power management system in a related art.

FIG. 2 is a flowchart illustrating an operation of a power management system of the related art.

Referring to FIG. 1 and FIG. 2, when the system power of the power management system is turned on, the timing controller communicates with the power management chip through I2C bus. Specifically, the timing controller transmits the configuration information of the level shifter to the power management chip through the I2C bus. The configuration information of the level shifter can be registered in a register map in the power management chip. After receiving the configuration information of the level shifter, the power management chip may further adjust the configuration information of the level shifter to obtain the adjusted configuration information (LS settings) of the level shifter and sends the adjusted configuration information of the level shifter to the level shifter to control the level shifter to generate clock signals of a preset number. For example, the level shifter can output 6 CK signals or 8 CK signals according to the received configuration information of the level shifter. The clock signals of the preset number can be sent to the drive circuit of the display panel for generating scanning signals for multiple rows to drive the display panel to display images.

The power management chip can output a VL voltage and a VGH voltage. However, during an electro-static discharge (ESD) test, when the VL voltage output by the power management chip is less than 1.8V and the VGH voltage is less than 3.5V, the configuration information of the level shifter may be reset, which results an error in the output of the level shifter, so that the display images of the display panel are abnormal.

Accordingly, the present disclosure proposes a display driving circuit. The display driving circuit comprises a power management chip, a level shifter, and a detection circuit. The power management chip is electrically connected with the level shifter and the detection circuit. The power management chip is configured to send first configuration information, generate second configuration information according to a detection voltage, and send the second configuration information. The level shifter is configured to output multiple clock signals according to the first configuration information or the second configuration information. The detection circuit is configured to generate the detection voltage according to an output voltage of the power management chip and a preset threshold and send the detection voltage to the power management chip.

The detection circuit is included in the display driving circuit. The detection circuit is used to detect the output voltage of the power management chip, the detection voltage is generated according to the output voltage of the power management chip and the preset threshold, and the detection voltage is sent to the power management chip. The power management chip regenerates the second configuration information according to the detection voltage sent by the detection circuit and sends the second configuration information to the level shifter. The level shifter outputs multiple clock signals according to the second configuration information, which can avoid the output error of the level shifter, thereby improving the abnormality of the display images caused by the output error of the level shifter.

Figure 3:
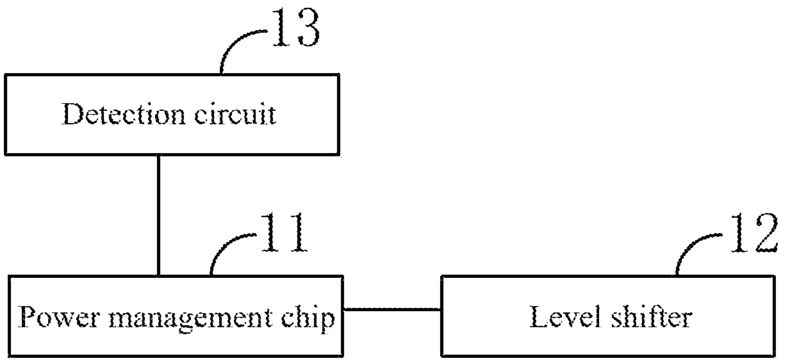
FIG. 3 shows a block diagram of a display driving circuit according to an embodiment of the present disclosure.

FIG. 3 shows a block diagram of a display driving circuit according to an embodiment of the present disclosure.

The display driving circuit comprises a power management chip 11, a level shifter 12, and a detection circuit 13. The power management chip 11 is electrically connected to the level shifter 12 and the detection circuit 13.

The display driving circuit may also comprise other components, such as a timing controller. The application does not limit other components of the display driving circuit.

The detection circuit comprises a voltage division circuit and a comparison circuit. The voltage division circuit is electrically connected to the comparison circuit. The output voltages of the power management chip comprise a first output voltage and a second output voltage. The voltage division circuit may divide the first output voltage or may divide the second output voltage. For example, when the first output voltage is greater than the second output voltage, the first output voltage may be divided, so that the voltage which is obtained from the division of the first output voltage is the same as the second output voltage.

The voltage division circuit is used to divide the first output voltage to obtain a divided voltage, and the divided voltage is equal to the second output voltage. Of course, according to the embodiment of the present disclosure, in the case that the first output voltage is greater than the second output voltage, the second output voltage may be increased to be equal to the first output voltage. It can be understood that there are various implementation manners for setting the first output voltage and the second output voltage, which are input into the comparison circuit, to be equal, and the application does not limit the specific implementation of the voltage division circuit.

The voltage division circuit comprises a first resistor and a second resistor, wherein one terminal of the first resistor is electrically connected to the first output voltage, the other terminal of the first resistor is electrically connected to one terminal of the second resistor and the comparison circuit respectively, and the other terminal of the second resistor is grounded. For example, when the first output voltage is twice the second output voltage, the first resistor is equal to the second resistor. That is, the voltage division circuit makes the divided voltage of the first output voltage is halved, and the divided voltage of the first output voltage is equal to the second output voltage.

The comparison circuit is configured to compare the divided voltage with a preset threshold to generate the detection voltage. The detection voltage can be sent to the power management chip for further processing.

The comparison circuit comprises a comparator. The comparator comprises a positive input terminal, a negative input terminal, and an output terminal, wherein the positive input terminal is electrically connected to the divided voltage and the second output voltage, the negative input terminal is electrically connected to the reference voltage, and the output terminal is electrically connected to the detection voltage.

Both the second output voltage and the divided voltage of the first output voltage can be connected to the positive input terminal of the comparator. When the second output voltage is equal to the divided voltage of the first output voltage, the first output voltage and the second output voltage are in a balanced state. At this time, the comparator may compare the voltage input from the positive input terminal with the reference voltage input from the negative input terminal to obtain the detection voltage.

For example, when the voltage input on the positive input terminal of the comparator does not exceed the reference voltage, the detection voltage output by the comparator may be at a low level; when the voltage input on the positive input terminal of the comparator exceeds the reference voltage the detection voltage output by the comparator may be at a high level. Of course, the comparator may have many types. For another example, when the voltage input to the positive input terminal of the comparator does not exceed the reference voltage, the detection voltage output by the comparator may be at a high level; when the voltage input to the positive input terminal of the comparator exceeds the reference voltage, the detection voltage output by the comparator may be at a low level. It should be understood that the present disclosure does not limit the type of comparator.

In the embodiment of the present disclosure, the input of the comparator may also be compared with a preset threshold range. For example, the input of the comparator can be compared with the upper limit of the preset threshold range and the lower limit of the preset threshold range, respectively, so as to determine whether the detection voltage is at a high level or a low level. The present disclosure does not limit the preset threshold value or the preset threshold range.

Further, the power management chip is configured to receive the detection signal output by the comparison circuit and regenerate second configuration information when a rising edge of the detection signal is detected. For example, the power management chip comprises a comparison detection circuit. The comparison detection circuit is electrically connected to the output terminal of the comparison circuit. The comparison detection circuit receives the detection signal output by the comparison circuit, notifies the power management chip to regenerate the second configuration information when a rising edge of the detection signal is detected, and sends it to the level shifter.

The second configuration information may comprise adjusted register data in the power management chip. The register data may drive the level shifter to generate a plurality of normal scan signals. The second configuration information may be adaptively adjusted according to a different type of level shifter and a different type of power management chip. The present disclosure does not limit the specific composition of the second configuration information.

The detection circuit is included in the display driving circuit. The detection circuit is used to detect the output voltage of the power management chip, the detection voltage is generated according to the output voltage of the power management chip and the preset threshold, and the detection voltage is sent to the power management chip. The power management chip regenerates the second configuration information according to the detection voltage sent by the detection circuit and sends the second configuration information to the level shifter. The level shifter outputs multiple clock signals according to the second configuration information, which can avoid the output error of the level shifter, thereby improving the abnormality of the display images caused by the output error of the level shifter.

The detection circuit further comprises a voltage stabilization circuit, which is electrically connected to the voltage division circuit and the comparison circuit respectively. The voltage r stabilization circuit can be used for stabilizing the input voltage input to the comparator, which prevents current backflow and ensures the stability of the display driving circuit.

The voltage stabilization circuit comprises a first voltage-stabilization diode and a second voltage-stabilization diode. The anode of the first voltage-stabilization diode is electrically connected to the second output voltage, and the cathode of the first voltage-stabilization diode is electrically connected to the positive input terminal of the comparator. The anode of the second voltage-stabilization diode is electrically connected to the voltage division circuit, and the cathode of the second voltage-stabilization diode is electrically connected to the positive input terminal of the comparator. It can be understood that there are many types of voltage-stabilization diodes in the voltage stabilization circuit, and the present disclosure does not limit the types of voltage-stabilization diodes.

The display driving circuit may further comprise a timing controller. The timing controller may be electrically connected to the power management chip. The timing controller may send the first configuration information of the level shifter to the power management chip through an I2C communication interface. The power management chip may comprise a register map for storing the first configuration information and the second configuration information, so as to speed up the reading speed of the configuration information.

The display driving circuit may be disposed in a display panel. The display panel further comprises a pixel unit array. The pixel unit array comprises a plurality of pixel units arranged in rows and columns. The level shifter is electrically connected to the external pixel unit array for controlling the pixel units in the respective rows of the pixel unit array to be scanned row by row.

Each pixel unit in the pixel unit array may comprise a plurality of pixel sub-units, such as a red sub-pixel unit, a green sub-pixel unit, and a blue sub-pixel unit. Each of the sub-pixel units may be provided with a thin film transistor. The gates of the thin film transistors of sub-pixel units in one row may be electrically connected to the corresponding gate line. When the level shifter can output 8 clock signals CK1-CK8, these 8 clock signals can be used to control the turned-on and turned-off states of the thin film transistors of the sub-pixel units in each row of the pixel unit array, and the sub-pixel units in the respective rows are scanned row by row.

The display panel has various types. Different types of display panels may have different driving modes. For example, one gate line in some display panels can drive sub-pixel units in two rows.

In practical applications, the power management chip and the level shifter of the embodiment of the present disclosure may be disposed in the same power management IC.

Figure 4:
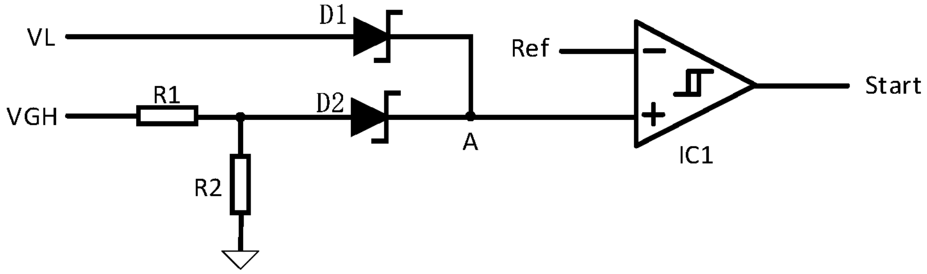
FIG. 4 shows a schematic diagram showing a detection circuit according to an embodiment of the present disclosure.

FIG. 4 shows a schematic diagram showing a detection circuit according to an embodiment of the present disclosure.

The detection circuit of the embodiment of the present disclosure may comprise a voltage division circuit, a comparison circuit, and a voltage stabilization circuit, wherein the voltage division circuit may comprise a first resistor R1 and a second resistor R2; the comparison circuit may comprise a comparator IC1; the voltage stabilization circuit may comprise a first voltage-stabilization diode D1 and a second voltage-stabilization diode D2.

Referring to FIG. 4, the first output voltage may be VGH, and the second output voltage may be VL. Both the first output voltage and the second output voltage may be generated by the power management chip. The second output voltage VL can be connected to the positive input terminal of the comparator IC1 through the first voltage-stabilization diode D1. The first output voltage VGH can be connected to the positive input terminal of the comparator IC1 through the second voltage-stabilization diode after being divided by the first resistor R1 and the second resistor R2. Ref can be a reference voltage, which is connected to the negative input terminal of the comparator IC1. Ref can be preset. The detection voltage can be Start.

For example, since the VGH voltage is greater than the VL voltage, R1 and R2 can be used to divide the VGH voltage, so that the divided voltage of VGH is balanced with VL. For example, R1=R2, VGH is 10V, the voltage on the point A is 5V, and the two voltages are in a balanced state. For another example, R1 is 9.4K, R2 is 10K, and Ref can be 1.8V. That is, the first resistor may not be equal to the second resistor, and a certain range of a resistance error is allowed.

Figure 5:
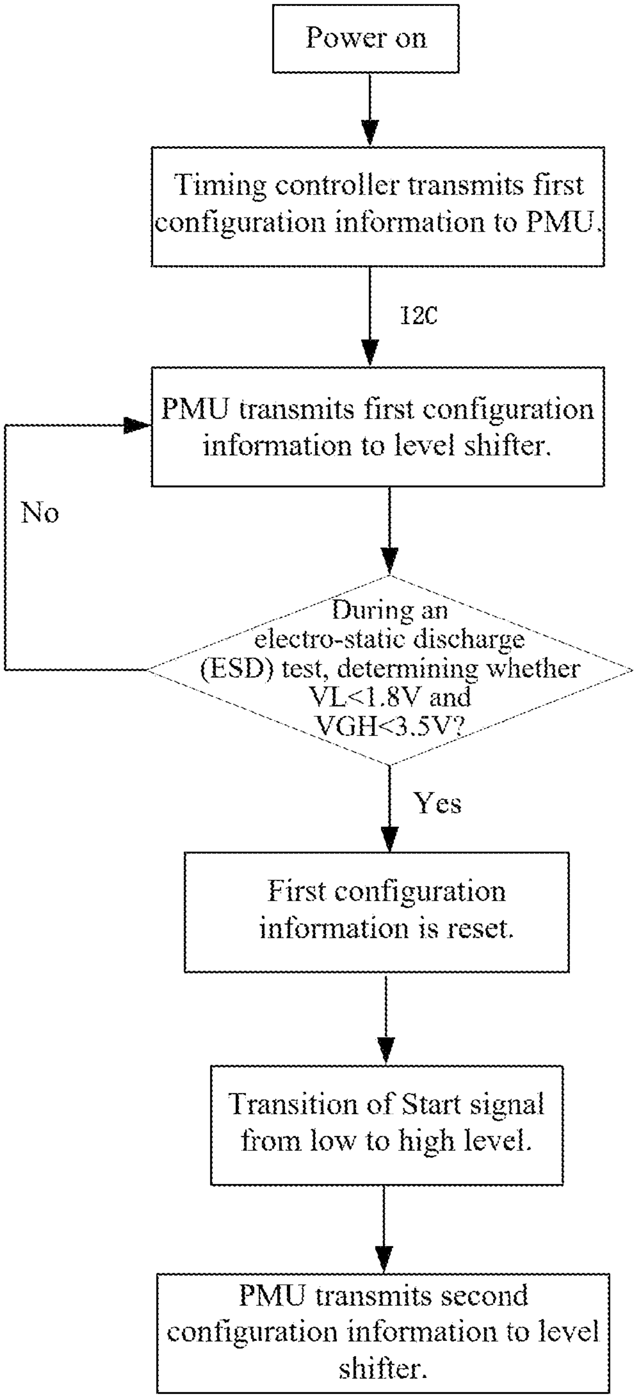
FIG. 5 shows a schematic diagram showing an operation of a display driving circuit according to an embodiment of the present disclosure.

FIG. 5 shows a schematic diagram showing an operation of a display driving circuit according to an embodiment of the present disclosure.

When the system power of the display driving circuit is turned on, the timing controller communicates with the power management chip through I2C. Specifically, the timing controller transmits the first configuration information of the level shifter to the power management chip through the I2C bus. The first configuration information of the level shifter can be registered in a register map in the power management chip. During an electro-static discharge (ESD) test, if both the VL voltage and the VGH voltage are at a low level, for if the VL voltage is less than 1.8V and the VGH voltage is less than 3.5V, the first configuration information of the level shifter may be reset, which results an abnormal output of the level shifter. At this time, in FIG. 4, since the voltage on the A point is lower than the voltage on the Ref point, the detection voltage is at a low level. Therefore, in the embodiment of the present disclosure, the detection signal can be sent to the power management chip. When the ESD test stops, the VL and VGH voltages will gradually recover. When VL is greater than 1.8V or VGH is greater than 1.8V, since the voltage on the A point is greater than the voltage on the Ref point, the detection signal can change to a high level from the low level. The power management chip detects the rising edge of the detection signal and regenerates the second configuration information, so that the output of the level shifter returns to normal.

Figure 6:
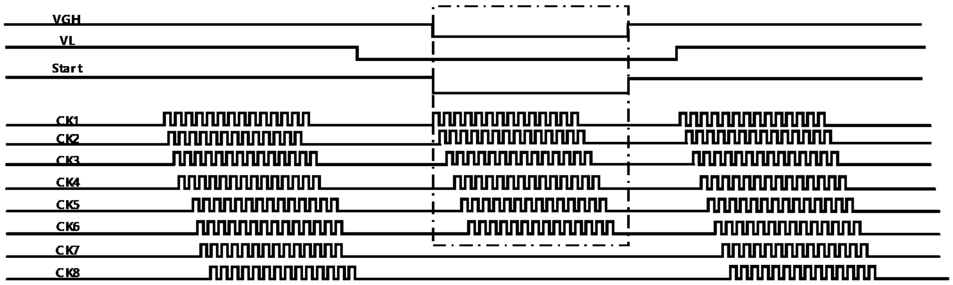
FIG. 6 is a schematic diagram showing a timing of an operation of a display driving circuit according to an embodiment of the present disclosure.

FIG. 6 is a schematic diagram showing a timing of an operation of a display driving circuit according to an embodiment of the present disclosure.

When VGH being less than 3.5V is not simultaneous with VL being less than 1.8V, for example, when VL is at a low level when VGH is at a high level, VL is at a high level when VGH is at a low level, or both VGH and VL are at a high level at the same time, the output of the level shifter can be normal CK1-CK8. That is, the output of the level shifter is on an 8 CK mode, which can output 8 clock signals. When VGH being less than 3.5V is simultaneous with VL being less than 1.8V, for example, when both VGH and VL are at a low level at the same time, the output of the level shifter is abnormal (shown in the dotted block in FIG. 6). For example, originally 8 clock signals should be output, but only 6 clock signals are output as lacking of two clock signals CK7 and CK8.

Further, referring to FIG. 4 and FIG. 6, when VGH and VL are not at a low level at the same time, the potential of the A point is high, and the Start signal can output a high level; and when both VGH and VL are at a low level at the same time, the potential of the A point is low, and the Start signal can output a low level. When an external ESD test is stopped, at this time, VGH and VL are not at a low level at the same time, and the Start signal changes to a high level from the low level. At this time, the power management chip detects the rising edge of the Start signal and regenerates the second configuration information, so that the output of the level shifter returns to normal.

In addition, the present disclosure also provides a display driving device. The display driving device comprises a terminal host and the display driving circuit, and the terminal host is connected with the display driving circuit.

In summary, in the embodiment of the present disclosure, a detection circuit is included in the display driving circuit. The detection circuit is used to detect the output voltage of the power management chip, the detection voltage is generated according to the output voltage of the power management chip and the preset threshold, and the detection voltage is sent to the power management chip. The power management chip regenerates the second configuration information according to the detection voltage sent by the detection circuit and sends the second configuration information to the level shifter. The level shifter outputs multiple clock signals according to the second configuration information, which can avoid the output error of the level shifter, thereby improving the abnormality of the display images caused by the output error of the level shifter. The embodiment is suitable for various types of display panels, such as a liquid crystal display (LCD).

In the above-mentioned embodiments, the description of each embodiment has its own emphasis. For parts that are not described in detail in a certain embodiment, reference may be made to the relevant descriptions of other embodiments.

The display driving circuit, the display driving device, and the display driving method provided by the embodiments of the present application have been described in detail above. Specific examples are used herein to illustrate the principles and implementations of the present application. The descriptions of the above embodiments are only used to help understand the technical solutions and core ideas of the present application. Those of ordinary skill in the art should understand that they can still make modifications to the technical solutions described in the foregoing embodiments, or perform equivalent replacements to some of the technical features. However, these modifications or substitutions do not make the essence of the corresponding technical solutions deviate from the scope of the technical solutions of the embodiments of the present application.

What is claimed is:

1. A display driving circuit comprising:
a power management chip configured to send first configuration information, generate second configuration information according to a detection voltage, and send the second configuration information;
a level shifter, electrically connected to the power management chip, configured to output multiple clock signals according to the first configuration information or the second configuration information; and
a detection circuit, electrically connected to the power management chip, configured to generate the detection voltage according to an output voltage of the power management chip and a preset threshold and send the detection voltage to the power management chip,
wherein the first configuration information is register data, wherein the second configuration information comprises adjusted register data, and each of the register data and the adjusted register data is configured to drive the level shifter to generate a plurality of clock signals.

2. The display driving circuit of claim 1, wherein the detection circuit comprises a voltage division circuit and a comparison circuit, and the voltage division circuit is electrically connected to the comparison circuit.

3. The display driving circuit of claim 2, wherein the output voltage of the power management chip comprises a first output voltage and a second output voltage, wherein the voltage division circuit is configured to divide the first output voltage to obtain a divided voltage, and the divided voltage is equal to the second output voltage,
the comparison circuit is configured to compare the divided voltage with the preset threshold to generate the detection voltage.

4. The display driving circuit of claim 3, wherein the voltage division circuit comprises:
a first resistor electrically connected between the first output voltage and the comparison circuit; and
a second resistor is electrically connected to the first resistor.

5. The display driving circuit of claim 4, wherein the comparison circuit comprises a comparator, and the comparator comprises:
a positive input terminal electrically connected to the divided voltage and the second output voltage;
a negative input terminal electrically connected to a reference voltage; and
an output terminal is electrically connected to the detection voltage.

6. The display driving circuit of claim 5, wherein when a voltage input from the positive input terminal of the comparator does not exceed the reference voltage, the detection voltage output by the comparator is at a low level; when the voltage input from the positive input terminal of the comparator exceeds the reference voltage, the detection voltage output by the comparator is at a high level.

7. The display driving circuit of claim 5, wherein the comparator is used to compare an input of the comparator with a preset threshold range.

8. The display driving circuit of claim 5, wherein the detection circuit further comprises a voltage stabilization circuit, and the voltage stabilization circuit is electrically connected to the voltage division circuit and the comparison circuit.

9. The display driving circuit of claim 8, wherein the voltage stabilization circuit comprises:
a first voltage-stabilization diode having an anode electrically connected to the second output voltage and a cathode is electrically connected to the positive input terminal of the comparator; and
a second voltage-stabilization diode having an anode electrically connected to the voltage division circuit and a cathode is electrically connected to the positive input terminal of the comparator.

10. The display driving circuit of claim 6, wherein the power management chip is configured to receive a detection signal output by the comparison circuit and regenerate the second configuration information when a rising edge of the detection signal is detected.

11. The display driving circuit of claim 1, wherein the level shifter is electrically connected to an external pixel unit array for controlling pixel units in respective rows in the pixel unit array to be scanned row by row.

12. The display driving circuit of claim 1, wherein the register data is further configured to drive the level shifter to generate a plurality of scan signals.

13. The display driving circuit of claim 1, further comprising a timing controller which is electrically connected to the power management chip.

14. The display driving circuit of claim 1, wherein the power management chip comprises a register map, and the register map is configured to store the first configuration information and the second configuration information.

15. A display driving device comprising a terminal host and the display driving circuit of claim 1, the terminal host being electrically connected to the display driving circuit.

16. A display driving method applied to a display driving circuit that comprises:
a power management chip configured to send first configuration information, generate second configuration information according to a detection voltage, and send the second configuration information;
a level shifter, electrically connected to the power management chip, configured to output multiple clock signals according to the first configuration information or the second configuration information; and
a detection circuit, electrically connected to the power management chip, configured to generate the detection voltage according to an output voltage of the power management chip and a preset threshold and send the detection voltage to the power management chip, the display driving method comprising:
by the power management chip, sending the first configuration information to the level shifter;
by the detection circuit, detecting the output voltage of the power management chip;
by the detection circuit, generating the detection voltage according to the output voltage of the power management chip and the preset threshold and sending the detection voltage to the power management chip;
by the power management chip, regenerating the second configuration information according to the detection voltage sent by the detection circuit and sending the second configuration information to the level shifter; and
by the level shifter, outputting the clock signals in multiple according to the first configuration information or the second configuration information,
wherein the first configuration information is register data, wherein the second configuration information comprises adjusted register data, and each of the register data and the adjusted register data is configured to drive the level shifter to generate a plurality of clock signals.

17. The display driving method of claim 16, wherein the output voltage of the power management chip comprises a first output voltage and a second output voltage, and generating the detection voltage according to the output voltage of the power management chip and the preset threshold comprises:

dividing the first output voltage to obtain a divided voltage, the divided voltage being equal to the second output voltage; and comparing the divided voltage with the preset threshold to generate the detection voltage.

18. The display driving method of claim 16, wherein by the power management chip, regenerating the second configuration information according to the detection voltage sent by the detection circuit comprises:

receiving the detection signal output by a comparison circuit; and regenerating the second configuration information when a rising edge of the detection signal is detected.

19. The display driving method of claim 16, further comprising:

storing the second configuration information; and driving the level shifter according to the second configuration information to generate a plurality of scan signals.

* * * * *